United States Patent
Lee et al.

(10) Patent No.: US 6,339,515 B2
(45) Date of Patent: Jan. 15, 2002

(54) FLUID BEARING SEAL AND SUPPORT STRUCTURE

(75) Inventors: Chen-Hsiung Lee, San Jose; Holavanahally Seshachar Nagaraj; Neal Bertram Schirle, both of Morgan Hill, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/314,486

(22) Filed: May 18, 1999

Related U.S. Application Data

(62) Division of application No. 08/987,823, filed on Dec. 10, 1997, now Pat. No. 5,957,589.

(51) Int. Cl.⁷ .......................... G11B 17/02; F16C 17/10
(52) U.S. Cl. ................. 360/99.08; 360/98.07; 310/67 R; 384/112; 384/124
(58) Field of Search .................. 360/98.01, 98.07, 360/99.04, 99.08; 369/258, 261, 263; 310/67 R, 90; 384/107, 112, 113, 121, 123, 124; 29/898, 898.02, 898.04, 898.041, 898.07, 898.09, 898.11, 603.03

(56) References Cited

U.S. PATENT DOCUMENTS 5,743,656 A * 4/1998 Gomyo et al. .............. 384/124
5,806,987 A * 9/1998 Hose et al. ................. 384/100

* cited by examiner

*Primary Examiner*—David L. Ometz
(74) *Attorney, Agent, or Firm*—Altera Law Group, LLC

(57) ABSTRACT

A bearing structure for a spindle motor is disclosed. The bearing structure provides a fluid bearing seal and support structure that may simultaneously addresses the problems of preventing oil leakage, of maintaining the bearing integrity under shock, of reducing oil evaporation and of minimizing distortion of the active bearing surface. The bearing structure includes a thrust plate coupled to a shaft and a bearing plate and load plate coupled to a sleeve, wherein the load plate urges the bearing plate towards the thrust plate, and wherein an adhesive is interposed between the load plate and the thrust plate. The adhesive may be an UV epoxy. The sleeve is operatively coupled to a stator, and the stator rotates the sleeve upon receiving a drive signal. The bearing further includes a diffusion barrier disposed between the sleeve and the stator. A second diffusion barrier is disposed between the load plate and the shaft. The bearing structure may also include an O-ring disposed above the bearing plate for sealing a gap between the bearing plate and the sleeve.

4 Claims, 4 Drawing Sheets

FLUID BEARING SEAL AND SUPPORT STRUCTURE

This application is a Divisional of application Ser. No. 08/987,823, filed Dec. 10, 1997, now U.S. Pat. No. 5,957,589 which application are incorporated herein by reference.

BACKGROUND OF THE INVENTION

1. Field of the Invention

This invention relates in general to a bearing structure for a spindle motor, and more particularly to a fluid bearing seal and support structure for use in a spindle motor.

2. Description of Related Art

Disk drives are computer mass storage devices from which data may be read and/or to which such data may be written. In general, they comprise one or more randomly accessible rotating storage media, or disks, on which data is encoded by various means. In magnetic disk drives, data is encoded as bits of information including magnetic field reversals grouped in tracks on the magnetically-hard surface of the rotating disks. The disks are stacked in a generally parallel and spaced-apart relationship and affixed at their inner diameter ("ID") to a common hub which is rotationally coupled to a stationary spindle shaft by a pair of bearings, typically ball bearings.

With the growing trend toward even lower height form factor disk drives, the length of the spindle shaft and spacing between the upper and lower bearings becomes a significant consideration in meeting specific drive height constraints. As drive height is decreased, a proportionately shorter spindle must be accommodated within the decreased height constraints with a concomitantly shorter spacing available between the upper and lower bearings supporting the hub on the spindle.

Rotary spindle motors having fluid bearings for supporting the rotary member rather than traditional ball bearings typically include a shaft having at least one axial thrust plate and a hub, which may be a rotary hub, having a sleeve portion generally enclosing the shaft and thrust plate, thus forming a journal bearing with bearing fluid disposed therein. The bearing fluid will form capillary seals at one or more ends of the shaft that are exposed to ambient air pressure.

The problem with such constructions is that under certain conditions the capillary seal may break down and fluid may leak from the bearing. Disruption of the seal may be caused by shock or vibration. Under certain conditions the rotating portion of the bearing may be displaced along the axis of the shaft. In the normal course of events, lubricant flows around the end of the thrust plate from the side with decreasing clearance to the side with increasing clearance. If, however, because of sudden shock or vibration, the lubricant flow around the thrust plate is impeded, fluid will be pushed toward one end of the shaft or the other, possibly breaking down the surface tension which holds the seal in place.

Leakage may also occur when there are inaccuracies in the fabrication of the patterned grooves used by the thrust plate's upper and lower surfaces to maintain a desired net pressure gradient. The object of the grooves is to create a high pressure region in the middle of each thrust plate surface and to create ambient pressure zones at the inner diameter of the thrust plate, adjacent the shaft, and at the outer diameter in the gap between the readily outermost edge of the thrust plate and the sleeve. This type of pressure distribution ordinarily results in no displacement of bearing fluid, that is, the static pressures will equalize. However, fabrication inaccuracies do occur, as does tilt in the bearing, or any other physical phenomena, and these factors can alter the pressure balance in the bearing fluid resulting in flow across the bearing. The flow of bearing fluid can overcome the surface tension seal at either end of the bearing and cause the fluid to leak. The situation is particularly acute at the thrust plate end where pressure imbalances between the upper and lower surfaces of the thrust plate may create a net flow which is near the capillary seal at the upper surface of the thrust plate.

Nevertheless, prior axial bearing support structures have not simultaneously address preventing oil from leaking out, maintaining the bearing integrity under shock, reducing oil evaporation and minimizing distortion of the active bearing surface. Rather, existing designs have addressed only a fraction of the requirements, e.g., only evaporation and shock induced bearing separation or distortion and evaporation.

For example, U.S. Pat. No. 5,490,021, issued Feb. 6, 1996, to Johannes C. A. Muller et al., and assigned to U.S. Phillips Corporation, herein incorporated by reference, disclosed a dynamic groove bearing for a hard disk drive. The dynamic groove bearing includes a sleeve-like housing having a locking piece that includes a bearing disk portion which cooperates with an annular bearing disk provided on a shaft. A pressure member is adapted to compress an annular, elastically deformable sealing element to thereby seal the interface between the housing and the locking piece and to pretension the locking piece against a seat formed on the housing. However, Muller et al. does not address evaporation and shock induced bearing separation.

It can be seen that there is a need for an axial bearing support structure that prevents oil from leaking out, maintains the bearing integrity under shock, reduces oil evaporation and minimizes distortion of the active bearing surface.

SUMMARY OF THE INVENTION

To overcome the limitations in the prior art described above, and to overcome other limitations that will become apparent upon reading and understanding the present specification, the present invention discloses a bearing structure for a spindle motor.

The present invention provides a fluid bearing seal and support structure that simultaneously addresses preventing oil leakage, maintaining the bearing integrity under shock, reducing oil evaporation and minimizing distortion of the active bearing surface.

A system in accordance with the principles of the present invention includes a dynamic fluid bearing for a spindle motor having a thrust plate secured to a shaft and a bearing plate and load plate secured to a sleeve. The load plate urges the bearing plate towards the thrust plate. An adhesive is interposed between the load plate and the thrust plate.

Other embodiments of a system in accordance with the principles of the invention may include alternative or optional additional aspects. One such aspect of the present invention is that the adhesive is an UV epoxy.

Another aspect of the present invention is that the system further including a diffusion barrier disposed between the load plate and the shaft.

Another aspect of the present invention is that the system further including a diffusion barrier disposed between the sleeve and the shaft.

Another aspect of the present invention is that the adhesive maintains integrity between the load plate and the bearing plate when a shock condition occurs.

Another aspect of the present invention is that the system further including an O-ring disposed above the bearing plate for sealing a gap between the bearing plate and the sleeve.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a fluid bearing seal and support structure that may simultaneously prevent oil leakage, maintain the bearing integrity under shock, reduce oil evaporation and minimize distortion of the active bearing surface.

Figure 1:
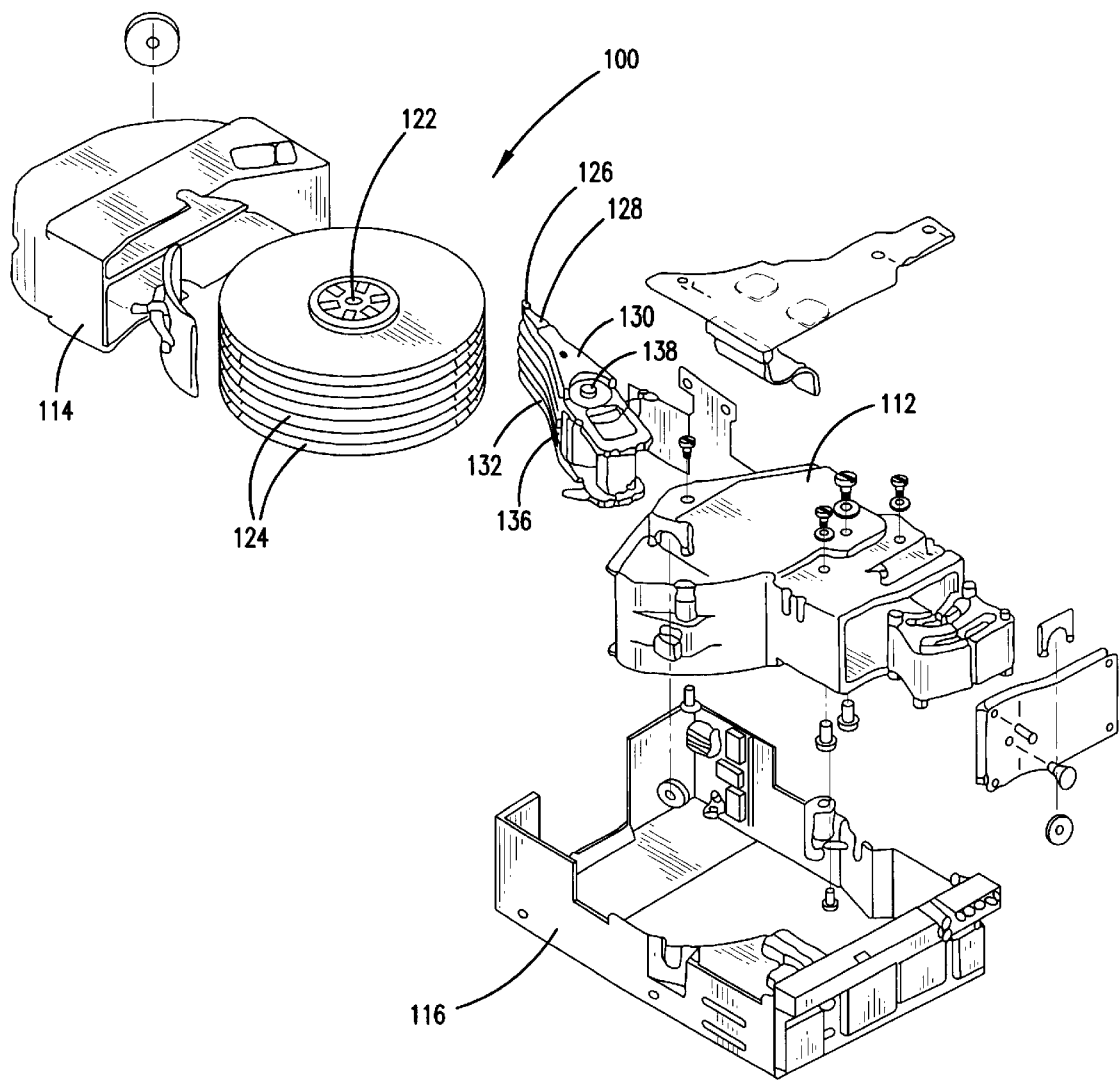
FIG. 1 illustrates an exploded view of a magnetic storage system.

FIG. 1 illustrates an exploded view of a magnetic storage system 100. The disk drive 100 includes a housing 112 and a housing cover 114 which, after assembly, is mounted within a frame 116. Mounted within the housing is a spindle shaft 122. Rotatably attached to the spindle shaft 122 are a number of magnetic storage disks 124. In FIG. 1, multiple disks 124 are attached to the spindle shaft 122 in spaced apart relation. The disks 124 rotate on spindle shaft 122 which is powered by a motor (not shown). Information is written on or read from the disks 124 by heads or magnetic transducers (not shown) which are supported by sliders 126. Preferably, sliders 126 are coupled to the suspensions or load springs 128. The load springs 128 are attached to separate arms 130 on an E block or comb 132. The E block or comb 132 is attached at one end of an actuator arm assembly 136. The actuator arm assembly 136 is rotatably attached within the housing 112 on an actuator shaft 138. The rotary actuator assembly 136 moves the integrated transducer/suspension assembly in accordance with the present invention in an arcuate path across the surface of the storage disk 124. However, those skilled in the art will recognize that the invention is not meant to be limited to use in the particular storage device described above.

Figure 2:
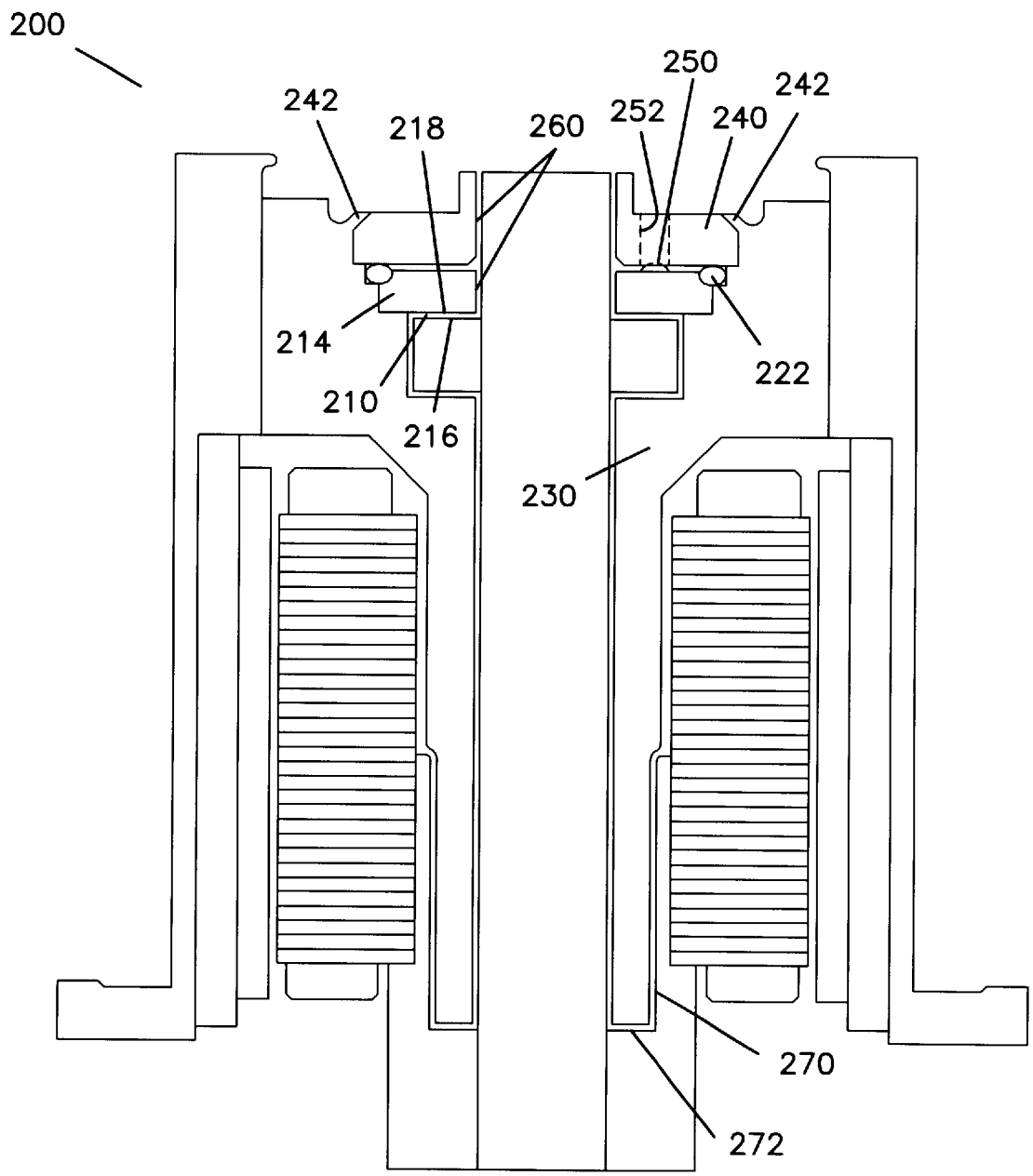
FIG. 2 illustrates the configuration of a fluid bearing seal for a spindle motor according to the present invention.

FIG. 2 illustrates the configuration of a fluid bearing seal 200 for a spindle motor according to the present invention. Hydrodynamic pressure is generated at the axial bearing 210 and the axial bearing plate 214 when the bearing surfaces 216, 218 are rotating with respect to each other. Therefore, bearing plate 214 must be very flat. Distortion should be minimized during and after assembly. This is accomplished by placing the O-ring 222 on top of the axial bearing plate 214. The O-ring 222 is placed at the interface between the axial bearing plate 214 and sleeve 230 to prevent oil from leaking out. Compression of the O-ring 222 is provided by load plate 240 through the fingers 242 or other means.

It is important that load plate 240 should not impinge the bearing plate 214 during the assembly or thereafter. Therefore, a nominal gap, such as a tenth of a millimeter, is desired. A gap at the axial bearing 210 can suddenly form during a vertical shock. The gap at the axial bearing 210 creates a vacuum that pulls air in because the O-ring 222 is highly compliant. This mechanism is prevented by applying a few adhesive droplets 250 between the load plate 240 and the axial bearing plate 214. The adhesive 250 is applied through a hole, e.g., at least two holes 180 degrees apart to maintain balance, in the load plate 240. This allows the load plate 240 to be installed immediately after oil fill and installation of bearing plate 214 and O-ring 222. The adhesive 250 can then be applied through the a hole 252 in the load plate 240. The hole 252 allows the use of a UV cure aerobic adhesive 250. This also allows adhesive 250 application at the same station as adhesive seal application at location 242. The adhesive 250 may be an UV epoxy, wherein a UV cure of the adhesive 250 can also be performed at the same station.

Diffusion barriers 260, 270 are disposed near the top of the shaft just outside of the top axial bearing 210 and at the bottom of the shaft just outside of the bottom radial bearing 272. The diffusion barriers 260, 270 typically include narrow gaps that offer significant resistance to flow and mass transfer of lubricant vapor.

Figure 3:
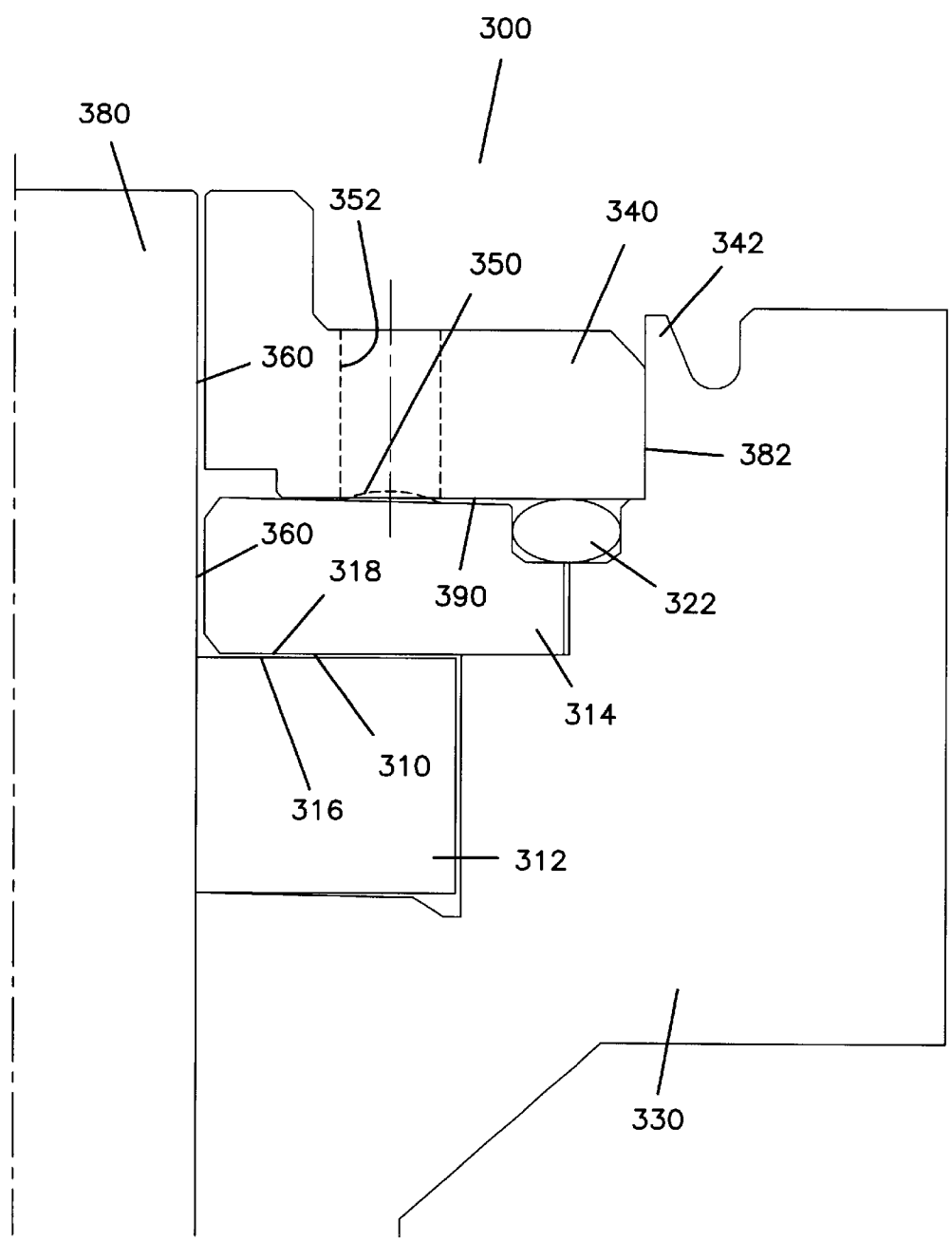
FIG. 3 illustrates the top cross section of the spindle.
Figure 4:
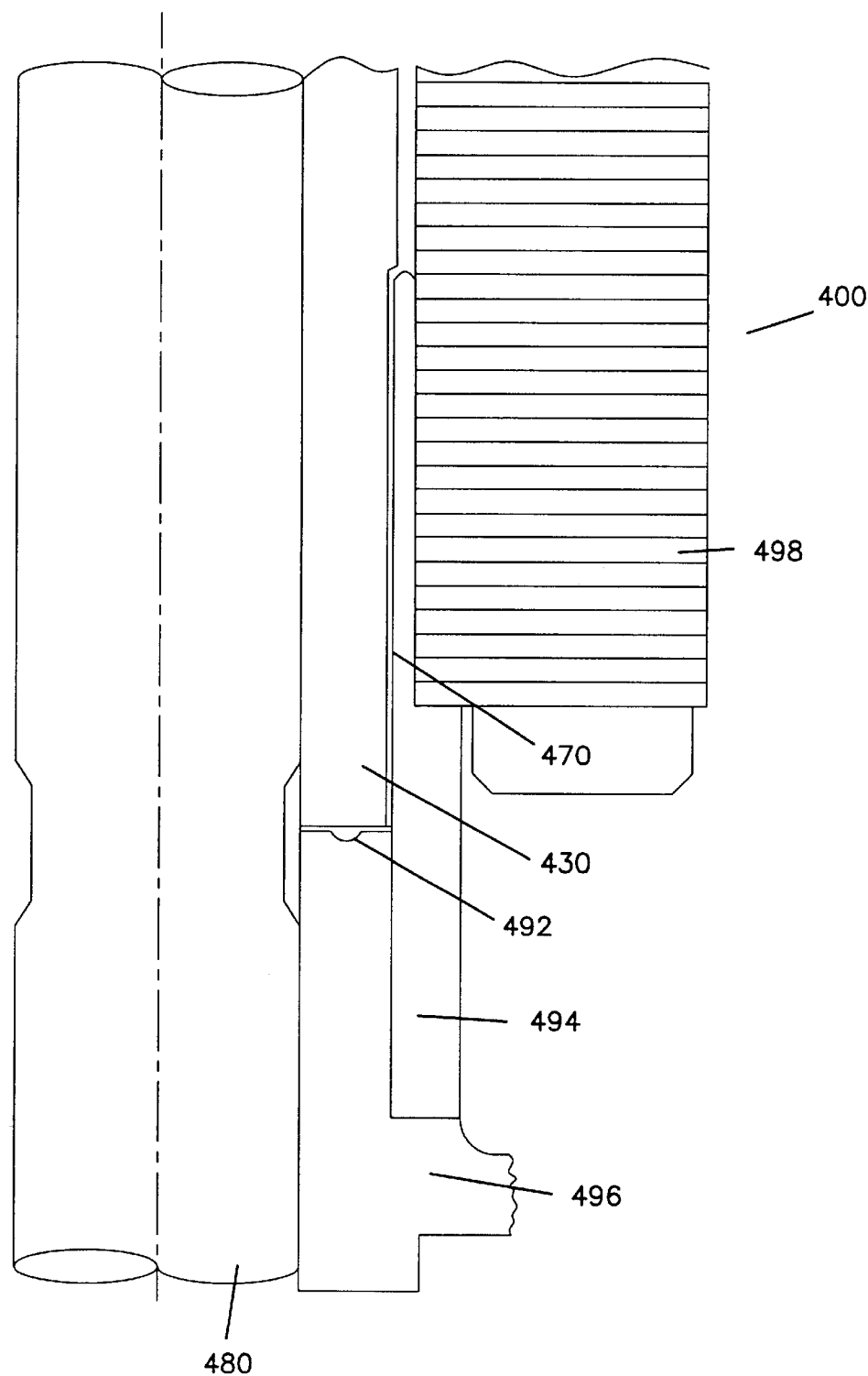
FIG. 4 shows the bottom cross section of the spindle.

FIGS. 3 and 4 show details at the top 300 and bottom 400 areas of the spindle respectively. In FIG. 3, the top cross section 300 of the spindle is shown. The load plate 340 which secures the opposing plate of the axial plate (bearing plate) 314 forms a first level of barrier because of the small radial gap 360 on the inner diameter near the shaft 380. The second barrier is formed by the narrow radial gap 382 and the relatively narrow axial gap 390. Radial gap 382 is located between the load plate 340 and the sleeve 330. The axial gap 390 is located between the bearing plate 314 and the load plate 340. FIG. 3 also shows a hole 352 in the load plate 340 for applying the adhesive 350, O-ring 322 that is compressed by load plate 340 through the fingers 342 or other means, axial bearing 310, bearing surfaces 316, 318 and thrust plate 312.

FIG. 4 shows the bottom cross section 400 of the spindle. At the lower radial bearing end, a small axial gap 492 is provided between end of the sleeve 430 and the top end of the mount flange 496. The mount flange 496 is a press fit on the shaft 480. The stator mount 494 is a press fit on the mount flange 496 and is used for mounting the stator lamination stack 498. A long narrow annular cylindrical gap 470 is formed between the end of the sleeve 430 and the stator mount 494. Both of the above mentioned axial 492 and radial 470 gaps form effective labyrinths offering significant resistance to mass transfer of lubricant vapor.

These gaps are between rotating and stationary surfaces and have been shown to be effective in this function in the range of 0.025 to 0.050 mm. Gaps smaller than 0.025 mm could be incorporated provided manufacturing and assembly level tolerances permit them without causing surface interference. Gaps larger than 0.05 mm may be used only if calculated mass transfer rates are acceptable. For example for a radial gap of 0.025 mm (1 thousandth of an inch) at a diameter of 5 mm and a length of 2 mm for the barrier, calculated evaporative loss at 70° C. amounts to about 3.25 mg over 5 years. To meet mean time between failure requirements, sufficient reservoir capacity will have to be provided so that the loss of the lubricant does not affect the functional performance of the spindle bearing system.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for providing a dynamic fluid bearing for a spindle motor, comprising:

providing a bearing plate and a load plate; and securing the bearing plate and the load plate to a sleeve by applying an adhesive in a gap formed directly between the load plate and the bearing plate and curing the adhesive to form a seal, wherein the load plate urges the bearing plate away from the load plate.

2. The method of claim 1 wherein the adhesive is an UV epoxy.

3. The method of claim 1 wherein the adhesive maintains integrity between the load plate and the bearing plate when a shock condition occurs.

4. The method of claim 1 wherein the adhesive maintains integrity between the load plate and the bearing plate by absorbing tolerances of the load plate and the bearing plate when a shock condition occurs.

* * * * *

UNITED STATES PATENT AND TRADEMARK OFFICE
CERTIFICATE OF CORRECTION

PATENT NO. : 6,339,515 B2 Page 1 of 1
DATED : January 15, 2002
INVENTOR(S) : Lee et al.

It is certified that error appears in the above-identified patent and that said Letters Patent is hereby corrected as shown below:

<u>Title page,</u>
Item [56], References Cited, U.S. PATENT DOCUMENTS, insert the following:

| | | | |
|---|---|---|---|
| -- | 4,332,428 | 6/1982 | Maruyama |
| | 4,694,213 | 9/1987 | Gowda et al. |
| | 4,892,418 | 1/1990 | Asada et al. |
| | 4,998,033 | 3/1991 | Hisabe et al. |
| | 5,089,732 | 2/1992 | Konno et al. |
| | 5,112,141 | 5/1992 | Asada et al. |
| | 5,142,173 | 8/1992 | Konno et al. |
| | 5,427,456 | 6/1995 | Hensel |
| | 5,433,529 | 7/1995 | Hensel |
| | 5,490,021 | 2/1996 | Muller et al. |
| | 5,516,212 | 5/1996 | Titcomb |
| | 5,533,811 | 7/1996 | Polch et al. |
| | 5,536,088 | 7/1996 | Cheever et al. |
| | 5,559,382 | 9/1996 | Oku et al. |
| | 5,634,724 | 6/1997 | Zang et al. |

FOREIGN PATENT DOCUMENTS

| | | | |
|---|---|---|---|
| | 0 754 871 A1 | 1/1997 | European Pat. Off. |
| | 08-004769 | 1/1996 | Japan |
| | 09-06065 | 3/1997 | Japan |
| | 09-217736 | 8/1997 | Japan |
| | 63-167113 | 7/1998 | Japan |
| | 63-167114 | 7/1998 | Japan |
| | 63-167115 | 7/1998 | Japan -- |

Signed and Sealed this

Twenty-ninth Day of July, 2003

JAMES E. ROGAN
*Director of the United States Patent and Trademark Office*